United States Patent [19]

Strickland

[11] Patent Number: 4,527,162
[45] Date of Patent: Jul. 2, 1985

[54] RADIOMETER

[75] Inventor: John I. Strickland, Nepean, Canada

[73] Assignee: Canadian Patents and Development Limited-Societe Canadien Ne Des Brevets Et D'Exploitation Limitee, Ottawa, Canada

[21] Appl. No.: 387,416

[22] Filed: Jun. 11, 1982

[30] Foreign Application Priority Data

Feb. 23, 1982 [CA] Canada .................................. 396795

[51] Int. Cl.³ .............................................. H04B 7/00
[52] U.S. Cl. ................................................... 343/351
[58] Field of Search ................. 343/351; 374/129, 121;
250/252.1; 356/216; 324/78 R, 78 D; 307/231,
517, 263; 364/487; 73/861.05; 340/347 NT, 347
AD

[56] References Cited

U.S. PATENT DOCUMENTS

| | | |
|---|---|---|
| 3,017,505 | 1/1962 | Clapp . |
| 3,023,361 | 2/1962 | Conner, Jr. . |
| 3,129,330 | 4/1964 | Seling . |
| 3,325,644 | 6/1967 | Frye et al. . |
| 3,380,055 | 4/1968 | Fow et al. . |
| 3,493,753 | 2/1970 | Stowe . |
| 3,911,435 | 10/1975 | Mardon et al. ...................... 343/351 |
| 4,008,398 | 2/1977 | Schramm et al. . |
| 4,144,527 | 3/1979 | Butler et al. ................. 340/347 NT |
| 4,317,184 | 2/1982 | Leszczynski ........................... 367/99 |
| 4,347,515 | 8/1982 | Hoover, Jr. ........................ 343/351 |

Primary Examiner—Theodore M. Blum
Assistant Examiner—Gregory Issing

[57] ABSTRACT

A radiometer of the switched type has an R.F. switch connecting a detector selectively either to an antenna whose temperature (in terms of noise energy) is to be determined, or to a reference temperature, i.e. a resistive termination. The detector output is passed through an amplifier whose gain is switched between positive and negative values (for example +1 and −1) synchronously with the R.F. switch. The output of the switched gain amplifier is integrated to produce a rising voltage when the gain is positive and a falling one when it is negative. When it is positive the detector is connected to the antenna. By means of a zero crossing detector, a counter is started when this voltage crosses zero. After a fixed period, the R.F. switch and switched gain amplifier are reversed by the counter to cause the voltage to fall in accordance with the temperature of the resistive termination. The zero crossing detector and a counter measure the time interval until the voltage again crosses zero, such time interval being compared to the fixed period to provide a comparison of the unknown and reference temperatures independent of the gain of the detector, which is a valuable improvement over prior radiometers. Also, by measuring time rather than voltage, the arrangement facilitates providing a digital output more suitable for storage and transmission of the data than the analog output of prior radiometers. The instrument, which is relatively simple, rugged and compact, lends itself well to unattended use in monitoring the effect of rain storms on transmission in the 11.7 to 12.2 GHz band employed for satellite communication.

14 Claims, 2 Drawing Figures

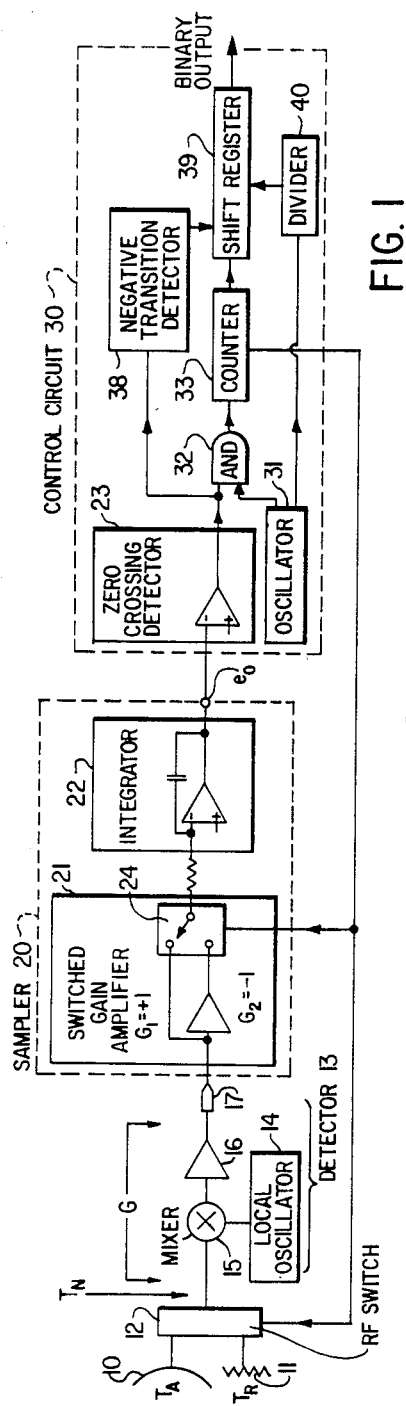
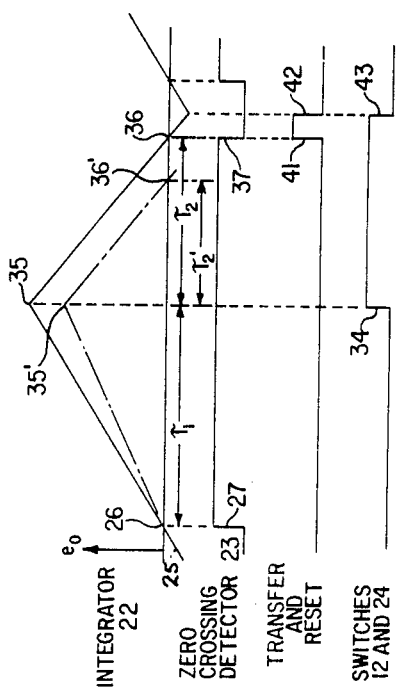

RADIOMETER

BACKGROUND OF THE INVENTION (a) Field of the Invention

This invention relates to radiometers, by which term there is included apparatus for measuring electromagnetic radiation at any desired frequency, e.g. generally from VHF up to and including the optical region.

While, as explained below, radiometers according to the invention have other uses, the invention has primarily been developed for determining the attenuation of radio energy at frequencies above about 3 GHz and especially above about 10 GHz arising from water in the atmosphere in the form of rain or droplets in clouds. By international agreement the frequency band from 11.7 to 12.2 GHz has been allocated for communications between some satellites and earth.

Liquid water absorbs energy above about 10 GHz, and hence rain storms can significantly attenuate the signals to and from a satellite. A radiometer of the type provided by the present invention can be used to measure and record the levels of such attenuation experienced at a chosen location over a period of time, thus helping to assess the suitability of such location for the installation of a satellite communication ground station. In addition, the data so generated can be used to help design the station itself, i.e. in terms of such considerations as power, sensitivity and the type of antenna most suited to the job, as well as providing an estimate of the likely percentage of operating time that the station can be expected to be effectively out of action due to rain storms. By taking such measurements simultaneously at one or more additional locations, the improvement in performance which would be obtained using site-diversity can be determined.

Since liquid water absorbs microwave energy at the frequency under consideration, it also emits this energy. In the presence of rain within the sensitive volume of an antenna, the energy level (spoken of as the "antenna temperature") increases. For very heavy rain this temperature even approaches the physical temperature of the rain. It has been shown that the path attenuation can be calculated from measurement of the sky-noise temperature with good accuracy, at least for attenuations less than 10 dB. A radiometer that measures the energy level of sky-noise, when associated with equipment that enables this energy level to be recorded over a period of time, e.g. both in the absence and in the presence of rain, thus provides a simple method of measuring the properties of precipitation attenuation along earth-space paths for frequencies above 10 GHz.

Since a radiometer is primarily an instrument for measuring emission (and thereby absorption), a radiometer according to the present invention can be used to measure emission, for example, from stellar sources at selected frequencies, e.g. the 1.42 GHz emitted by the hydrogen atom, or absorption due to oxygen or water vapour or other constituents in the atmosphere, e.g. from about 22.25 GHz (water vapour) and about 57 to 63 GHz (oxygen) up to anywhere in the optical region, e.g. infrared, visible and even ultraviolet.

(b) Prior Art

In the past, radiometers have mainly been laboratory instruments, i.e. comparatively expensive equipment needing attention by skilled operators and the relatively controlled environment of a laboratory. One of the objectives of the present invention is to provide a radiometer that is capable of being embodiment in a simple, rugged, low-cost device that can, if necessary, be left unattended for relatively long periods of time in remote areas and will perform reliably even when subject to wide environmental variations such as extremes of temperature.

A further desirable feature of at least the preferred form of the present invention is that its output should be in digital rather than analog form, since a digital output greatly simplifies transmission of the data to a central monitoring station and its storage.

Known radiometers fall into three basic categories: total power, switched and noise-adding radiometers.

A total power radiometer consists of a high-grain amplifier at the frequency of interest, followed by a detector which usually has a square-law response. Examples are provided by U.S. Pat. Nos. 3,129,330 issued Apr. 14, 1964 to T. V. Seling and 3,023,361 issued Feb. 27, 1962 to L. B. Conner Jr. Total power radiometers suffer from the twin disadvantages that the output has a comparatively low sensitivity to changes in the antenna temperature (the quantity to be measured), but a high sensitivity to variations in the amplifier gain, requiring extreme gain stability, i.e. laboratory precision. The output voltage of the detector, which is proportional to the input power, is $e_o$ where $$e_o = KG(T_A + T_N)$$

where

G is the amplifier gain, $T_A$ is the antenna temperature, $T_N$ is the equivalent front-end noise, i.e. the contribution of the mixer, amplifier and local oscillator, assuming a heterodyne system, and K is a constant that includes the equivalent noise bandwidth, the detector constant and Boltzmann's constant.

Because $T_N$ is dominant over $T_A$, e.g. with $T_A$ near 0° K. and $T_N$ of the order of 1000° K., a change of $T_A$ of one degree will change $e_o$ by only one part in a thousand and the sensitivity of $e_o$ to changes of gain is $$\frac{de_o}{e_o} = \frac{dG}{G} = \frac{dT_A}{T_A + T_N}$$

so that a change in gain of only one part in 1000 is equivalent to a change in antenna temperature of 1°.

Switched, or so-called Dicke radiometers reduce the sensitivity to gain fluctuations by incorporating a radio-frequency switch to compare the antenna temperature with that of a resistive termination at a reference temperature. In this way the radiometer output consists of a constant term which can be ignored and A.C. components at the switching frequency and its harmonics. The magnitude of the A.C. components is generally measured by means of a phase-sensitive detector driven by the same oscillator that drives the radio-frequency switch. Thus, the radiometer output is given by $$e_o = KG[(T_N + T_R) - (T_N + T_A)]$$
$$= KG(T_R - T_A)$$

where $T_R$ is the reference temperature.

Hence $T_N$ has been removed and the sensitivity of $e_o$ to changes in $T_A$ has been improved. Theoretically, if $T_R = T_A$, $e_o$ is independent of gain and equal to zero. In practice, however, $T_A$ is substantially less than $T_R$, since it is difficult to maintain a reference temperature at only a few degrees Kelvin, which is a typical value for $T_A$. Assuming $T_A$ near 0° K. and $T_R$ near 273° K., a change of 1° in $T_A$ is equivalent to a change in gain of 1 part in 273. This involves a more attainable gain stability than is necessitated by the total power radiometer. Nevertheless, even the switched type of radiometer is affected by gain variations due to the impracticability of using a reference temperature near the antenna temperature.

This difficulty is overcome by the noise-adding radiometer which injects additional noise into the antenna port, permitting a null condition when $$T_R = T_I$$

where $T_I$ is the injected noise temperature. The injected noise is derived from a noise diode whose output has to be passes through an electrically variable attenuator that is automatically controlled to maintain the null condition. While this type of radiometer is unaffected by gain variations, changes in the characteristics of the noise source or the variable attenuator can result in erroneous values of antenna temperature.

An example of a radiometer of the switched type is provided by U.S. Pat. No. 3,017,505 issued Jan. 16, 1962 to R. E. Clapp and an example of a noise-adding radiometer is given in U.S. Pat. No. 3,380,055 issued Apr. 23, 1968 to B. R. Fow et al. Applicant is also aware of U.S. Pat. Nos. 3,911,435 issued Oct. 7, 1975 to A. Mardon et al and 3,325,644 issued June 13, 1967 to E. O. Frye et al directed to further radiometers.

Another problem with all prior forms of radiometer is that the output is an analog voltage whose value is a measure of the antenna temperature. For storage or transmission of the data, this analog value must first be digitized. A radiometer having a digital output would avoid this need.

SUMMARY OF THE INVENTION

The present invention has the objective of providing improvements in respect of the various disadvantages of prior radiometers discussed above.

In its broadest aspect the invention consists of a radiometer having (a) first and second input means (e.g. an antenna receiving noise at an unknown energy level and a resistive termination providing noise at a reference energy level) for noise within a selected bandwidth (e.g. above 10 GHz and, in one example, in the band 11.7 to 12.2 GHz), (b) a detector for this bandwidth having an analog voltage output, (c) switching means for selectively connecting either the first or the second input means to the detector, (d) sampling means for receiving the detector output and for selectively integrating the same either with gain of one sign (e.g. positive) to generate a voltage of increasing magnitude of a first slope or with gain of the opposite sign to generate a voltage of decreasing magnitude of a second slope (e.g. a switched gain amplifier having equal and opposite gains), and (e) control means connected to the switching means and to the sampling means for simultaneously connecting one of the input means to the detector when the gain is of one sign and the other of the input means to the detector when the gain is of the other sign (whereby the slopes respectively become measures of the unknown and reference energy levels), the control means including means for comparing the steepness of the slopes.

In the preferred embodiment of the invention the slopes are compared by a time measuring circuit that determines the time interval required by the decreasing voltage to change by the same amount as the increasing voltage changes in a known time interval. The times when the increasing and decreasing voltages cross a reference level, e.g. zero, are determined. A counter is begun at the first of these times and the known time interval counted out. At the termination of this interval, e.g. half a second, the control means switches over the switching and sampling means to cause the increasing voltage to change direction and begin to decrease. The counter then measures a second time interval between such change of direction and the time when the decreasing voltage crosses the reference level.

The ratio between the first and second time intervals provides a measure of the unknown energy level relative to the reference level.

BRIEF DESCRIPTION OF THE DRAWINGS

A preferred embodiment of the invention is illustrated by way of example in the accompanying drawings, in which:

FIG. 1 is a circuit of a radiometer according to such embodiment; and

FIG. 2 is a series of pulse diagrams.

DESCRIPTION OF THE EMBODIMENT

The unknown noise power input, referred to as $T_A$, is detected by an antenna 10 which may be of any convenient type (dish or horn) for the frequency band of interest, which, for the purposes of the present example, is assumed to be 11.7 to 12.2 GHz. The reference input, referred to as temperature $T_R$, is obtained from a resistive termination 11. These inputs are connected to an R.F. switch 12 whereby one or other is transmitted to a heterodyne detector 13 consisting of a local oscillator 14, mixer 15, I.F. amplifier 16 and rectifier 17. The equivalent front end noise of the detector is designated $T_N$ and its gain is designated G. The local oscillator 14 will have a frequency of 11.95 GHz, the output bandwidth being 500 MHz.

The output of the detector 13 is passed to a sampler 20 consisting of a switched gain amplifier 21 and an integrator 22. A switching portion 24 of the switched gain amplifier 21 is shown as switching between a gain $G_1$ of $+1$ or $G_2$ of $-1$, although these values need not necessarily be unity, and need not even be equal in value, although they must always be opposite in sign. The output of the switched gain amplifier is passed through the integrator 22 to a zero crossing detector 23 of a control circuit 30.

Assuming that, initially, the integrator output voltage $e_o$ is negative and the switch 12 is connected to the antenna 10. the gain of the switched gain amplifier is $G_1$ (positive) so that the voltage $e_o$ increased with time in the manner shown at 25 in FIG. 2 and is given by the equation $$e_o = \int KGG_1(T_A + T_N)dt + C$$

where C is a constant and all the other terms are as previously defined.

The positive-going, zero-crossing point 26 serves to define zero time and, at any time $\tau$ thereafter $e_o$ is given by $$e_o K G G_1 (T_A + T_N) \tau$$

At this zero time 26 the zero crossing detector 23 goes high as shown at 27 (FIG. 2) which is passed to an AND gate 32 of the control circuit 30 which also has an oscillator 31 and counter 33. The oscillator can have any convenient frequency, e.g. 153.6 KHz and emits clock pulses that are passed through the gate 32 by the control signal 27 to the counter 33. After a fixed time, e.g. half a second, the counter 33 will generate an output signal 34 (FIG. 2) that is passed to the R.F. switch 12 and the switching portion 24 of the switched gain amplifier 21. By this time, $\tau_1$, the value of $e_o$ will be as shown at 35 in FIG. 2 and will be proportional to $T_A + T_N$ as indicated by the equation above.

Reversal of the switches 12 and 24 by the counter 33 causes $e_o$ to follow the equation $$e_o = \int K G G_2 (T_R + T_N) dt + C$$

and to diminish in value, since $G_2$ is negative. After an additional time $\tau_2$, the voltage $e_o$ is given by $$e_o = K G G_2 (T_R + T_N) \tau_2 + K G G_1 (T_A + T_N) \tau_1$$

If $\tau_2$ is determined by the negative-going, zero-crossing point 36, i.e. $e_o = 0$, we have $$0 = G_2 \tau_2 (T_R + T_N) + G_1 \tau_1 (T_A + T_N)$$

$$\text{i.e. } \tau_2 = -\frac{G_1}{G_2} \tau_1 \left( \frac{T_A + T_N}{T_R + T_N} \right)$$

This equation reduces to $$\tau_2 = a\, T_A + b$$

where $a = -\dfrac{G_1}{G_2} \tau_1 \dfrac{1}{T_R + T_N}$ and $b = -\dfrac{G_1}{G_2} \tau_1 \dfrac{1}{T_R + T_N}$ When $G_1$ and $G_2$ are opposite in sign, $a$ and $b$ are both positive.

Thus $\tau_2$ is directly proportional to the antenna temperature $T_A$ and is independent of the amplifier gain $G$ and the parameters of most of the analog components. The stability of the measured antenna temperature thus depends on the stability of the coefficients $a$ and $b$ and hence on the stability of $T_R$ and $T_N$, but neither is expected to change significantly under normal conditions. For convenience the magnitudes of $G_1$ and $G_2$ are made nominally equal, but deviations from such equality are absorbed in the calibration of the instrument.

At the point 36 the signal 27 ceases, its trailing edge 37 being detected by a detector 38 to transfer the contents of counter 33 at time 41 to a shift register 39 and then reset the counter 33 at 42 and thereby reverse the switches 12 and 24 as shown at 43 to start the next cycle. From this data, the register 39 generates a binary output proportional to the time $\tau_2$ at a suitable bit rate for transmission, e.g. 300 bits per second, this rate being regulated by an input signal received from a divider 40 receiving its input from the oscillator 31.

FIG. 2 shows at 35' the value that will be attained by $e_o$ after the fixed time $\tau_1$ in the case of a lower value of $T_A$. The value of $e_o$ will then fall to cross the zero reference at 36' after a further time $\tau_2'$. In other words, the departure of $e_o$ from the reference voltage (zero) takes place at a variable slope (determined by the variable $T_A$) for a fixed time $\tau_1$ (under the control of the counter 33), while its return to the reference voltage takes place for a variable time $\tau_2$ at a fixed slope by virtue of the fact that this latter slope is determined by the equation integrating only the fixed parameters $T_R$, $T_N$, $G$ and $G_2$.

An important aspect of the control circuit is that it is arranged to measure a time interval rather than a voltage, a feature that lends itself readily to the generation of a digital output convenient for data recording and transmission to a central location.

ALTERNATIVES

The unknown input could be something other than an antenna. It could, for example, be a waveguide. If it is replaced by a cold load at a known temperature, e.g. liquid nitrogen or a zenity-pointing horn antenna, the radiometer can be used to measure the front end noise temperature $T_N$.

The principle of operation is not restricted to the microwave region in the neighbourhood of 10 GHz, since the primary restriction in operating frequency is the availability of a suitable radio frequency switch, mixer and local oscillation. The principle could be used at infrared and above by the use of mechanical or optical switching devices.

This invention is also applicable to small, portable apparatus to determine the integrated water vapour content along a path through the atmosphere using the water vapour absorption band near 22.25 GHz.

The invention also is applicable to scanning types of radiometer or others where the antenna temperature varies over short periods of time, since the measured temperature is the antenna temperature averaged over an individual period $\tau_1$, independent of the temperature measured over any previous period $\tau_1$.

The embodiments of the invention in which an exclusive property or privilege is claimed are defined as follows:

1. A radiometer comprising
   (a) first and second input means for electromagnetic energy within a selected bandwidth,
   (b) a detector for said bandwith having an analog voltage output,
   (c) switching means for selectively connecting one of said first and second input means to said detector,
   (d) sampling means for receiving said detector output and for selectively integrating the same with gain of one sign to generate a voltage of increasing magnitude of a first slope and with gain of the other sign to generate a voltage of decreasing magnitude of a second slope, and
   (e) control means connected to said switching means and said sampling means for connecting one of said input means to the detector when the gain is of one sign and the other of said input means to the detector when the gain is of the other sign,
   (f) said control means including means for comparing the steepness of said slopes.

2. A radiometer according to claim 1, wherein said means for comparing the steepness of the slopes comprises time measuring means for determining the time interval required by said voltage of decreasing magnitude to change by the same amount as said voltage of increasing magnitude.

3. A radiometer according to claim 1, wherein
(g) said first input means comprises means for receiving energy at an unknown level and said second input means comprises means for providing energy at a reference level,
(h) said control means is connected to said switching means and said sampling means for connecting said first input means to the detector to generate said voltage of increasing magnitude for a predetermined first time interval at said first slope proportional to said unknown level, and for connecting said second input means to the detector to generate said voltage of decreasing magnitude with a predetermined said second sloope for a second time interval proportional to said unknown level, and
(i) said means for comparing the steepness of the slopes comprises means for measuring said second time interval.

4. A radiometer according to claim 3, wherein said means for measuring said second time interval comprises
(j) means for determining a first time when said first input means is connected to the detector and said voltage of increasing magnitude crosses a reference level, and a second time when said second input means is connected to the detector and said decreasing voltage crosses said reference level,
(k) counting means for initiating said predetermined first time interval commencing at said first time and for connecting said second input means to the detector upon termination of said first time interval whereby to cause said voltage of increasing magnitude to change direction and begin decreasing, and
(l) said counting means also measuring said second time interval between such change of direction and said second time.

5. A radiometer according to claim 4, including means providing a digital output proportional to said second time interval.

6. A radiometer according to claim 3, 4 or 5, wherein said first input means is an antenna receiving energy at unknown level $T_A$, and said second input means is a resistive termination providing energy at reference level $T_R$, said detector having an equivalent front end noise at an energy level $T_N$, said second time interval being proportional to said first time interval according to the expression $(T_A+T_N)/T_R+T_N)$, whereby, with $T_R$ and $T_N$ constant, the value of $T_A$ is proportional to said second time interval.

7. A radiometer according to claim 1, wherein
(g) said first and second input means provide energy at known levels $T_A$ and $T_R$ respectively, said detector having an equivalent front end noise at an energy level $T_N$,
(h) said control means is connected to said switching means and said sampling means for connecting said first input means to the detector to generate said voltage of increasing magnitude for a predetermined first time interval at said first slope proportional to said unknown level, and for connecting said second input means to the detector to generate said voltage of decreasing magnitude with a predetermined said second slope for a second time interval proportional to said unknown level, and
(i) said means for comparing the steepness of the slopes comprises means for measuring said second time interval,
(j) said second time interval being proportional to said first time interval according to the expression $(T_A+T_N)/T_R+T_N)$ whereby, with $T_A$ and $T_R$ known, the value of $T_N$ is proportional to said second time interval.

8. A radiometer according to claim 1, 3 or 4, wherein said selected bandwith is above about 1 GHz.

9. A radiometer according to claim 1, 3 or 4, wherein said selected bandwidth is above about 10 GHz.

10. A radiometer according to claim 1, 3 or 4, wherein said selected bandwidth is 11.7 to 12.2 GHz for detecting radio noise emitted by rain within this bandwidth.

11. A radiometer according to claim 3, wherein said sampling means comprises
(j) a switched gain amplifier for receiving said detector output and for generating an output with a gain $G_1$ of one sign or a gain $G_2$ of the opposite sign, including a switching portion for selecting between these gains,
(k) an integrator for receiving the output of said switched gain amplifier and for generating said voltage of increasing magnitude when the gain is $G_1$ and said voltage of decreasing magnitude when the gain is $G_2$, and wherein said control means comprises
(l) a reference crossing detector connected to said integrator for determining a first time when said voltage of increasing magnitude crosses a reference level and a second time when said voltage of decreasing magnitude crosses said reference level,
(m) a counter connected to said reference crossing detector for initiating said predetermined first time interval commencing at said first time and connected to said switching means and said switching portion for connecting said second input means to the detector and for selecting gain $G_2$ in the switched gain amplifier upon termination of said first time interval whereby to cause said voltage of increasing magnitude to change direction and begin to decrease, and for measuring said second time interval between said change of direction and said second time, and
(n) means connected to said counter for providing a digital output proportional to said second time interval.

12. A radiometer according to claim 11, wherein said selected bandwidth is above about 1 GHz.

13. A radiometer according to claim 11, wherein said selected bandwidth is above about 10 GHz.

14. A radiometer according to claim 11, wherein said selected bandwidth is 11.7 to 12.2 GHz for detecting radio noise emitted by rain within this bandwidth.

* * * * *